United States Patent
Reams, III et al.

(10) Patent No.: US 8,510,826 B1
(45) Date of Patent: Aug. 13, 2013

(54) CARRIER-INDEPENDENT ON-DEMAND DISTRIBUTED DENIAL OF SERVICE (DDOS) MITIGATION

(75) Inventors: Orin Paul Reams, III, Charlestown, WV (US); Russell Alan Constantine, Manassas, VA (US)

(73) Assignee: Sprint Communications Company L.P., Overland Park, KS (US)

(*) Notice: Subject to any disclaimer, the term of this patent is extended or adjusted under 35 U.S.C. 154(b) by 1635 days.

(21) Appl. No.: 11/295,080

(22) Filed: Dec. 6, 2005

(51) Int. Cl.
*G06F 11/00* (2006.01)

(52) U.S. Cl.
USPC .............. 726/22; 709/225; 709/238; 713/188

(58) Field of Classification Search
USPC ................ 726/1, 22; 709/225, 235, 238, 239
See application file for complete search history.

(56) References Cited

U.S. PATENT DOCUMENTS

| | | | |
|---|---|---|---|
| 6,944,673 B2 | 9/2005 | Malan et al. | |
| 7,768,911 B2* | 8/2010 | Savagaonkar | 370/230 |
| 8,154,987 B2* | 4/2012 | Yavatkar et al. | 370/216 |
| 2002/0083175 A1* | 6/2002 | Afek et al. | 709/225 |
| 2002/0103916 A1 | 8/2002 | Chen et al. | |
| 2002/0166063 A1 | 11/2002 | Lachman et al. | |
| 2002/0194369 A1 | 12/2002 | Rawlins et al. | |
| 2003/0004689 A1 | 1/2003 | Gupta et al. | |
| 2003/0014665 A1 | 1/2003 | Anderson et al. | |
| 2003/0037141 A1* | 2/2003 | Milo et al. | 709/225 |
| 2003/0110396 A1 | 6/2003 | Lewis et al. | |
| 2005/0213504 A1 | 9/2005 | Enomoto et al. | |
| 2006/0028999 A1 | 2/2006 | Iakobashvili et al. | |
| 2006/0272018 A1 | 11/2006 | Fouant | |

OTHER PUBLICATIONS

Reams, Orin, IP Defender: Network-based Detection PowerPoint Presentation, Aug. 10, 2005.
Reams, Orin, IP Defender: Network Detailed Design Document, Feb. 21, 2005.
Non-Final Office Action mailed Sep. 4, 2007 in U.S. Appl. No. 11/294,979.

* cited by examiner

*Primary Examiner* — Fikremariam A Yalew

(57) ABSTRACT

Service provider-independent on-demand distributed denial of service (DDoS) mitigation. A mitigation provider provides a service to customers to remove or reduce DDoS attacks regardless of the customer's relationship with a service provider. Customer profiles about the customers' IP traffics are loaded into mitigation devices. When a DDoS attack occurs, customer profiles are activated in a set of the mitigation devices. Routes are also modified to steer customer traffic to the mitigation devices. DDoS packets are removed at the mitigation devices and the "cleaned" IP traffic is subsequently routed to the destination.

13 Claims, 6 Drawing Sheets

CARRIER-INDEPENDENT ON-DEMAND DISTRIBUTED DENIAL OF SERVICE (DDOS) MITIGATION

CROSS-REFERENCE TO RELATED APPLICATIONS

Not applicable

STATEMENT REGARDING FEDERALLY SPONSORED RESEARCH OR DEVELOPMENT

Not applicable.

BACKGROUND OF THE INVENTION

With the increasing demand from consumers and businesses for faster and cheaper Internet access along with a decreasing cost of computers and an expansion of technology around the world, a threat of distributed denial of service (DDoS) attacks is growing considerably on a daily basis. What was once considered a denial of service (DOS) attack on the Internet back in year 1999 could easily be overshadowed by the amount of noise of today's high-speed Internet. Even more dangerous than DOS attacks are distributed DDoS attacks. DDoS attacks are more malicious since an attack on a targeted element may originate from several sources simultaneously. The objective is to flood the targeted element with malicious or invalid packets to achieve the same goal as discussed above for an ordinary DoS attack. The targeted element becomes overwhelmed with malicious or invalid packets to the point where it ceases operation or goes into an initialization phase. As more and more appliances become IP-enabled, a possibility of those appliances becoming originators of malicious DDoS packets is a reality. In the near future, the possibility of 10-20 Gigabits DDoS attacks may be approaching.

A problem with DDoS attacks is the unknown factor, how much and where from. DDoS attacks can start from any network and adapt as fast as the perpetrator wants them to. Internet service providers, which shall be referred to as service providers, have been slow to launch costly network-based infrastructure, and more nimble companies are limited to the bandwidth of their Internet connections. However, service providers have a strong need to protect their customers from DDoS attacks.

Some businesses already offer a distributed network-based DDoS detection system such as Arbor Networks of Lexington, Mass., Narus of Mountain View, Calif., and the InMon Corporation of San Francisco, Calif. However, their systems are tailored to a per-customer or other limited arrangement. Their systems cannot be deployed on a large scalable multi-customer basis across a large network.

A solution is needed to allow service providers to provide scalable DDoS detection services for individual customers without adding numerous expensive hardware. A solution is also needed that would allow a third-party DDoS mitigation provider to provide a DDoS mitigation service to customers regardless of the customers' association with an Internet service provider. The mitigation provider can negotiate Internet access with the service providers and provide mitigation services to a customer that has an immediate need for DDoS services.

SUMMARY OF THE INVENTION

This disclosure describes, among other things, systems and computer-readable media for implementing a service provider-independent on-demand distributed denial of service (DDoS) mitigation.

In accordance with the present invention, a computer system having a processor and a memory to execute a method for providing a service provider-independent on-demand distributed denial of service (DDoS) mitigation is provided that includes establishing a baseline of normal internet protocol (IP) traffic for a customer. A customer profile is developed from the baseline to load into mitigation devices. The customer profile is activated in subsets of the mitigation devices when a DDoS attack occurs. Protocol configurations are implemented in routers to route the IP traffic to the subsets of mitigation devices. The IP traffic is filtered of DDoS packets based on the customer profile and the filtered IP traffic is routed to the customer.

In another aspect, a computer system having a processor and a memory to execute a method for implementing a distributed denial of service (DDoS) mitigation network by a mitigation provider is provided that includes providing network connections between the mitigation provider and service providers to provide access from the mitigation provider to customers associated with the service providers. With a DDoS detection method implemented to detect a DDoS attack to a customer, the mitigation provider is notified of the DDoS attack by the customer, or the DDoS attack is detected by the mitigation provider at an equipment of the customer. Mitigation devices are activated by the mitigation provider when the DDoS attack occurs. An internet protocol (IP) traffic destined for the customer is routed to the mitigation devices to remove DDoS packets. Analyzed IP traffic is subsequently routed to the customer.

In yet another aspect, one or more computer-readable media having computer-readable instructions embodied thereon for causing a computing device to perform a method for providing a service provider-independent on-demand distributed denial of service (DDoS) mitigation is provided that includes establishing a baseline of normal internet protocol (IP) traffic for a customer. A customer profile is developed from the baseline to load into mitigation devices. The customer profile is activated in subsets of the mitigation devices when a DDoS attack occurs. Protocol configurations are implemented in routers to route the IP traffic to the subsets of mitigation devices. The IP traffic is filtered of DDoS packets based on the customer profile and the filtered IP traffic is routed to the customer.

In yet another aspect, one or more computer-readable media having computer-readable instructions embodied thereon for causing a computing device to perform a method for implementing a distributed denial of service (DDoS) mitigation network by a mitigation provider is provided that includes providing network connections between the mitigation provider and service providers to provide access from the mitigation provider to customers associated with the service providers. With a DDoS detection method implemented to detect a DDoS attack to a customer, the mitigation provider is notified of the DDoS attack by the customer, or the DDoS attack is detected by the mitigation provider at an equipment of the customer. Mitigation devices are activated by the mitigation provider when the DDoS attack occurs. An interne protocol (IP) traffic destined for the customer is routed to the mitigation devices to remove DDoS packets. Analyzed IP traffic is subsequently routed to the customer.

BRIEF DESCRIPTION OF THE SEVERAL VIEWS OF THE DRAWINGS

The present invention is described in detail below with reference to the attached drawing figures, which are incorporated herein by reference, and wherein.

DETAILED DESCRIPTION OF THE INVENTION

Figure 1:
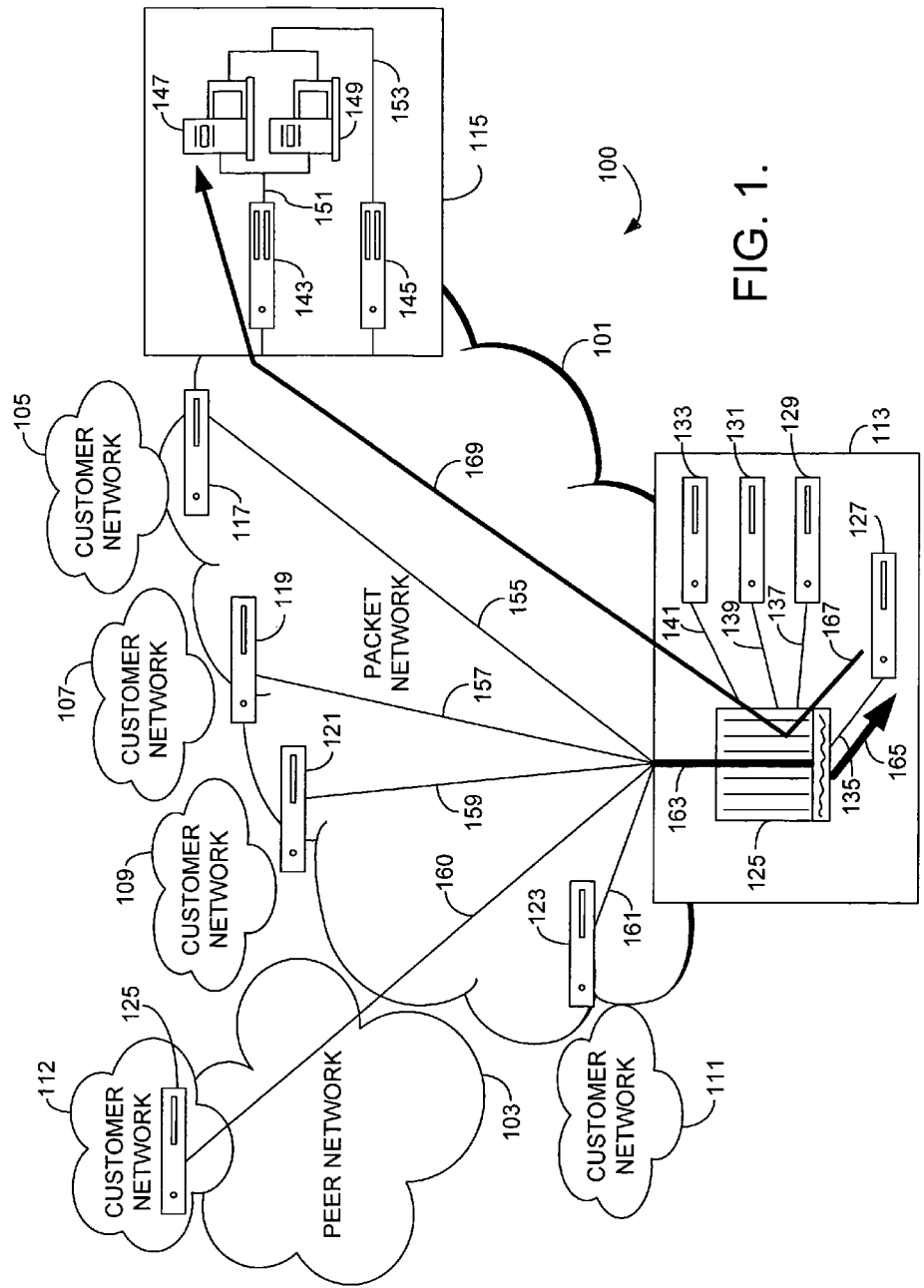
FIG. 1 is a block diagram of an exemplary DDoS detection service suitable for practicing an embodiment of the present invention.

The present invention will be better understood from the detailed description provided below and from the accompanying drawings of various embodiments of the invention, which describe, for example, systems and computer-readable media for implementing a service provider-independent on-demand distributed denial of service (DDoS) mitigation. The detailed description and drawings, however, should not be read to limit the invention to the specific embodiments. Rather, these specifics are provided for explanatory purposes that help the invention to be better understood.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

The present invention may be embodied as, among other things: a method, system, computer-program product, or combinations thereof. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and non-removable media, and contemplate media readable by a machine, database, or various other network devices.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

To help explain the invention without obscuring its functionality, an embodiment will now be referenced in connection with a computing network. Although the present invention can be employed in connection with a computing-network environment, it should not be construed as limited to the exemplary applications provided here for illustrative purposes.

Scalable DDoS Detection

A customer may subscribe to a network-based DDoS detection and mitigation service from their service provider. The service provider provides a DDoS detection service that begins with sampling packets in internet protocol (IP) traffic destined for the customer. This action may be accomplished by using such devices as the NETFLOW product from the Cisco Corporation of San Jose, Calif. The service provider samples packets at the customer's circuit interface for traffic directed into the customer's network, or at the service provider's interface or gateway towards the customer. Statistics are generated for the IP traffic that traverses the circuits and are forwarded to a collector. In implementing various embodiments of the present invention, the collector is a device that analyzes packets and compares destination IP addresses to a defined list of customer IP subnets. The collector may be obtained from various commercial vendors. The collector may be located in various places in the service provider's network. However, the service provider may provide for several regional collectors to be located throughout its network to accomplish a similar task for the same or different customers.

If the packets match the list of customer IP subnets, then the matching packets are forwarded to an analyzer. The collector filters unwanted IP subnets and allows packets associated with the targeted customers to pass through to the analyzer. The analyzer, like the collector, may also be obtained from various commercial vendors. However, the analyzer is significantly more costly than a collector. Hence, in implementing an embodiment of the present invention, the collector is used to minimize the amount of IP traffic that goes to the analyzer. This configuration reduces an overall costs of implementing embodiments of the present invention while allowing a carrier-grade detection service to be implemented by the service provider. This allows the service provider to cost effectively provide detection service to multiple customers.

Once a packet is forwarded to the analyzer, it is stored and, in one embodiment, is compared against a statistical heuristic engine. The heuristic engine may determine if the customer's IP traffic has anomalous and/or malicious traffic destined for it. The analyzer may generate an alert or alarm if there is a possible DDoS attack. Or, the analyzer may deliver information to a network operations center that monitors IP traffic across the network. From the network operations center, appropriate action may be taken to either warn of the DDoS attack or mitigate the DDoS attack.

In another embodiment of implementing the present invention, the packet or packets that are forwarded to the analyzer may be compared to a pre-configured profile that has been loaded into the analyzer. The profile, also known as a customer profile, may include a baseline of the customer's normal IP traffic. Different customers may have different profiles depending on their traffic flow, location, and equipment connected to the packet network. As a result, the packet (or packets) may be analyzed against the profile to determine if the packet falls outside a tolerance, exceeds a threshold, or extends beyond a limit for the normal IP traffic. If so, as stated above, an alarm, alert, or other action may be taken as part of the detection service.

To better explain the information discussed above, detailed information referring to the drawings will be explained below.

In FIG. 1, a block diagram of a DDoS detection service 100 is shown with a packet network 101 connected to a peer network 103, and customer networks 105, 107, 109, and 111. Peer network 103 is connected to customer network 112. Packet network 101 contains within itself a data collection center 113, a data analysis center 115, and routers 117, 119, 121, and 123. Data collection center 113 contains a gateway switch 125, a collector 127, and device 129, 131, and 133. Data analysis center 115 contains ethernet switches 143 and 145, and analyzers 147 and 149. Customer network 112 contains a router 125.

Data packets traverse the Internet using various protocols and information stored in the header of the packets. Details about how the packets move from one destination to another shall not be discussed here but additional information may be obtained elsewhere. DDoS detection service 100 may be viewed as operating in the Internet without making specific reference to it. Packet network 101 may be viewed synonymously as being a service provider or being part of a service provider network.

Packet network 101 operates with different customers located throughout the network while peer network 103 operates in the same fashion with customers. Customer networks 105, 107, 109, 111, and 112 represent the customers connected either to packet network 101 or peer network 103. Although not shown, data packets are constantly being delivered to customer networks 105, 107, 109, 111, and 112. In an embodiment of the present invention, when data packets are delivered to the customers, routers 117, 119, 121, 123, and 125 may sample, incorporate software to sample, or work with computing devices to sample some of the packets being delivered to the customers and divert them over logical connections 155, 157, 159, 160, and 161 to data collection center 113. The data packets will eventually be delivered to their rightful destination provided the data packets are valid.

As shown in FIG. 1, routers 117, 119, 121, and 123 are shown in packet network 101. However, another embodiment may be implemented whereby routers 117, 119, 121, and 123 may be shown respectively in customer networks 105, 107, 109, and 111. Likewise, customer network 112 shows router 125 within its network. Not only does this show a flexibility in implementing an embodiment of the present invention, it also shows that the present invention may operate without regards to a relationship between the service provider and the customer.

Connections 155, 157, 159, 160, and 161 are deemed logical because there is no physical connection in the packet network as shown, although an implementer may choose to incorporate a physical connection. Data packets and the routers may be configured to route information to a particular destination point. In FIG. 1, once the data packets are sampled, meaning that only a few data packets are captured over a periodic time interval, they are delivered to data collection center 113.

Within data collection center 113, the data packets are delivered to gateway switch 125 over a connection 163. Again, connection 163 is a logical connection but may also include hardwired connections. Gateway switch 125 sends the data packets to collector 127 over connection 135. A director 165 shows the manner in which data packets are delivered to collector 127. Gateway switch may operate with other devices such as devices 129, 131, and 133 respectively with connections 137, 139, and 141. Devices 129, 131, and 133 may include any number of devices that might provide a particular service to facilitate the function of data collection center 113. For example, device 129 might be an authentication, authorization, and accounting server. Device 131 might be an information server or alarming device. Device 133 might be a domain name system (DNS) server. In addition to the illustration, additional devices might be added or subtracted depending on the implementation desired.

Once the data packets are delivered to collector 127, collector 127 filters the data packets to obtain a subset of data packets. The subset is chosen based upon identifying which customers from customer networks 105, 107, 109, 111, and 112 are targeted to receive DDoS detection service. Not all customers are entitled to receive this service. Therefore, those customers that are not entitled to the service may have their sampled data packets re-delivered to the network to their destination. Note: This re-delivery may occur in an ordinary delivery of data packets or may be sent over a specific route so as not to have their sampled data packets re-captured again at the sampling point (i.e. use of static routes).

The subset of the sampled data packets that are associated with the customers that are to receive DDoS detection service may have their sampled data packets aggregated at collector 127 and delivered over connections 135, 163, or other logical connections to data analysis center 115. Using customer networks 109 and 112 as an example, data packets for customer networks 109 and 112 are preserved and sent to data analysis center 115. Other packets are not delivered so as not to waste resources in evaluating unnecessary data packets. When a new customer desires DDoS detection service, modifications may be made to include the new customer in the filtering process.

The subset may arrive at data analysis center and pass through ethernet switches 143 and 145. Over connections 151 and 153, the subset may be delivered to analyzers 147 and 149. At analyzers 147 and 149, the subset of the sampled data packets may be analyzed through various means to determine if the subset is valid data packets corresponding to normal IP traffic patterns, or whether the subset indicates abnormal data packets that may be indicative of a DDoS attack. The analysis of the subset may be accomplished using various techniques such as creating customer profiles that contain customer traffic data, developing statistical data associated with normal IP traffic, or using linear regression techniques that adjust normality of the data with the conditions of the customer network. There are many more techniques that my be employed. The idea here is to illustrate that the subset is compared to a model, an ideal, or a baseline to determine whether the subset contains data packets that are not normal.

For customer networks 109 and 112, if some of the data packets are found to be abnormal, a situation may be flagged to identify the abnormality as a possible DDoS attack. In such case, a notification may occur using various methods. An alarm may be triggered which may incorporate some type of action to occur. Or, a mitigation plan may be implemented depending upon how the customer has arranged to fight a DDoS attack. The customer might have chosen to implement a mitigation plan themselves or they may have solicited a third-party to provide a mitigation service.

Figure 2:
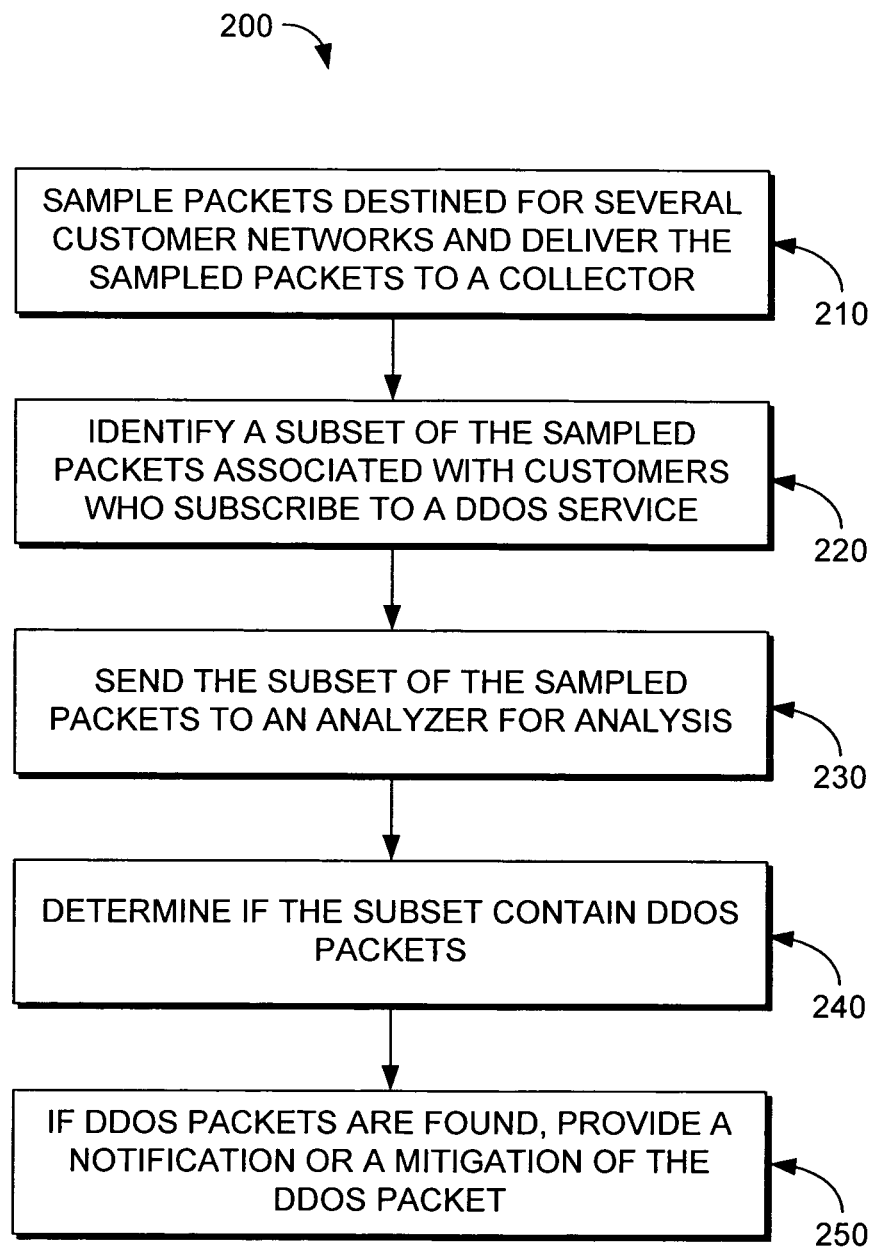
FIG. 2 is a flowchart of an exemplary process for providing a scalable DDoS detection when implementing an embodiment of the present invention.

Turning now to FIG. 2, a process for providing a scalable DDoS detection is provided in a method 200. In a step 210, as data packets are delivered to a customer, some of the packets are sampled and delivered over a network connection to collector 127. Step 210 may occur for several entities including a number of customers. As a result, in a step 220, some of the data packet may be filtered at collector 127 resulting in a forwarding of only those packets associated with customers needing DDoS detection service. The filtered packets are referred to as a subset (like in FIG. 1) so as not to confuse them with the original sampled data packets.

In a step 230, the subset is delivered to analyzers 143 and 145 for analysis. It may be noted that although two analyzers were shown in FIG. 1, additional analyzers may be added or one analyzer may be operated in implementing embodiments of the present invention. At analyzers 143 and 145 in a step 240, the subset is analyzed to find DDoS packets using the various techniques discussed in FIG. 1. In a step 250, if DDoS packets are found, a notification may be provided or a mitigation may be implemented to announce or remove the presence of the DDoS packets.

Figure 3:
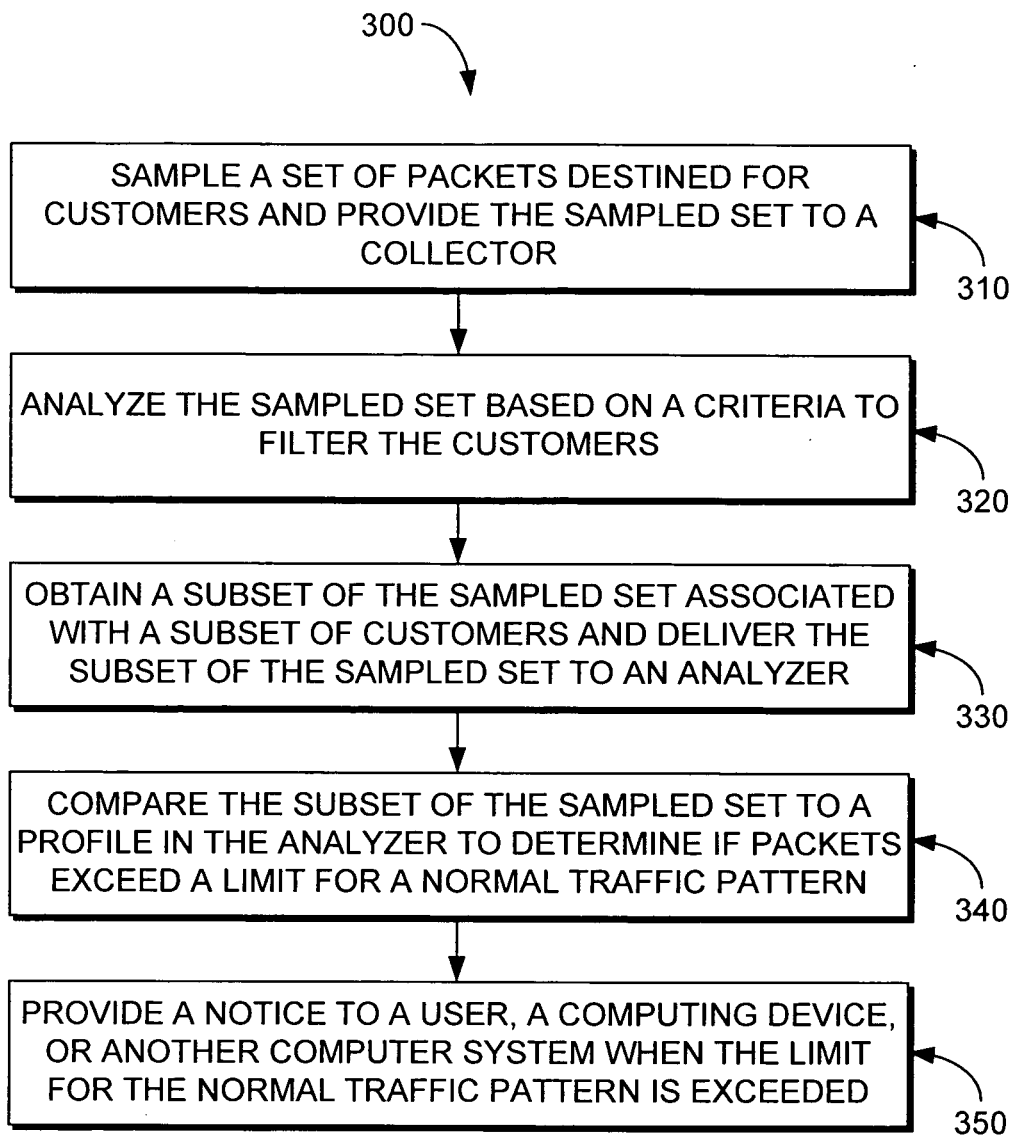
FIG. 3 is a flowchart of another exemplary process for providing a scalable DDoS detection when implementing an embodiment of the present invention.

In FIG. 3, another process for providing a scalable DDoS detection is provided in a method 300. Method 300 is similar to method 200 with some variations. In a step 310, like step 210, devices or computer programs may be used to sample a set of packets destined for customers. The sampled packets may be delivered to collector 127. In a step 320, the sampled packets may be analyzed and filtered based on a criteria that was discussed in FIG. 1. Like FIG. 2, a subset of those sampled packets are obtained in a step 330 and delivered to analyzers 143 and 145.

In a step 340, the subset is compared to customer profiles that may be pre-loaded into analyzers 143 and 145. As discussed in FIG. 1, other techniques may be implemented to provide for a comparison of data to a model, an ideal, or a baseline. Step 340 provides one example to determine if the packets in the subset exceed a limit for a normal traffic pattern associated with a customer. Because packets contain information in their headers, a packet may be traced to a customer's subnet. As a result, packets may be traced to the customer.

In a step 350, like step 250, if DDoS packets are found during the comparison process, a notice may be delivered to a user, a computing device, or another computer system. This means that the results occurring in step 350 may lead to a mitigation process since the present invention is associated with a DDoS detection.

The prior discussion is only for illustrative purposes to convey exemplary embodiments. The steps discussed in FIGS. 2 and 3 may be executed without regards to order. Some steps may be omitted and some steps may be executed at a different time than shown. Exemplary equipment shown in FIG. 1 may also be changed.

On-Demand DDoS Mitigation

A DDoS mitigation provider may build an infrastructure capable of absorbing significant amount of IP traffic, then processing packets for individual customers, and tunneling the non-malicious traffic back to the original destination hosts (customers). The initial investment in capital may be significant. The mitigation provider might lease Internet access from service providers such as the Sprint Corporation of Reston, Va., MCI of Ashburn, Va., Qwest of Denver, Colo., and Level 3 Communications of Broomfield, Colo. By having Internet access to multiple service providers, the mitigation provider may have a large scope for introducing route changes when a customer's network is impacted by a DDoS attack.

Figure 4:
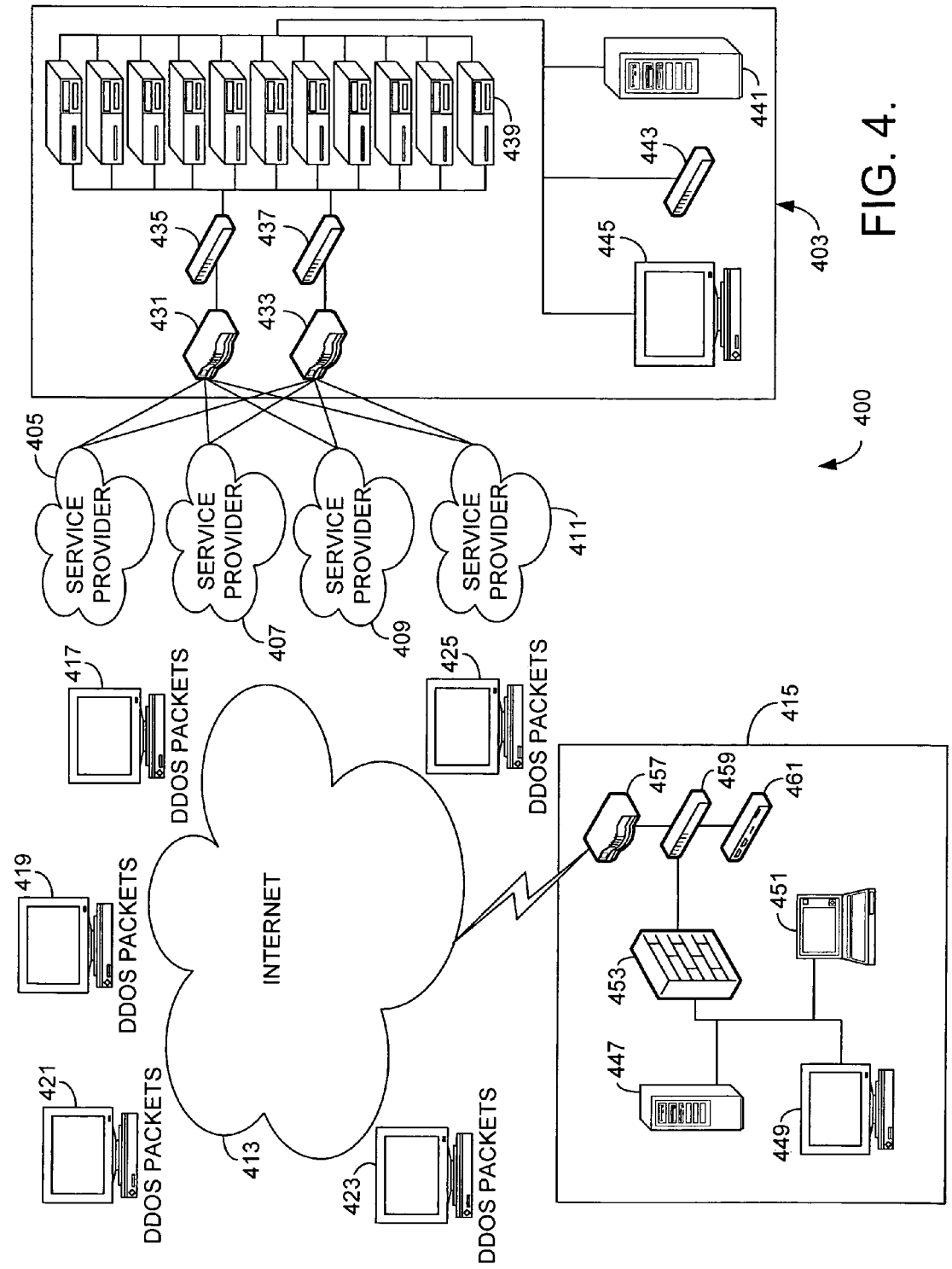
FIG. 4 is a block diagram of an exemplary DDoS mitigation service suitable for practicing an embodiment of the present invention.

In FIG. 4, a block diagram of a DDoS mitigation service 400 is shown with a mitigation provider 403 connected to service providers 405, 407, 409, and 411. The connection between mitigation provider 403 and service providers 405, 507, 409, and 411 indicates that mitigation provider 403 has obtained service from the different service providers and has access to an Internet 413. Likewise, a customer 415 has access to Internet 413. Customer 415 may or may not have obtained service through one of the service providers.

Mitigation provider 403 is structured to have multiple connections to service providers 405, 407, 409, and 411 to have an ability to configure routes when a DDoS attack occurs from a set of computing devices 417, 419, 421, 423, and 425 also connected to Internet 413. Mitigation provider 403 may include routers 431 and 433, ethernet switches 435, 437, and 443, a set of mitigation devices 439, a management server 441, and a monitoring center 445. The list of equipment illustrated in mitigation provider 403 is shown as an exemplary setup for an embodiment of the present invention. An implementer may configure or deploy different equipment than those shown in the illustration in implementing the same or different embodiments of the present invention.

As shown in FIG. 4, routers 431 and 433 enable data packets to move between other networks and mitigation provider 403. Mitigation provider 403 may receive data packets through routers 431 and 435, and may also send data packets through the same routers. Ethernet switches 435 437, and 443 provide an access to send the data packets to one of the set of mitigation devices 439 and to receive data packets as well. In FIG. 4, ten mitigation devices are shown represented by the set of mitigation devices 439. Depending on the level or size of service, the number of mitigation devices for the present invention may vary. The mitigation devices receive data packets and remove those data packets that are considered DDoS packets. The remaining data packets are sent through ethernet switches 435, 437, or 443 back through routers 431 and 433 to their final destination to a customer's network.

Management server 441 may incorporate a variety of functions. One of those functions may be to provide an access to the set of mitigation devices 439 since the set of mitigation devices 439 are accessed to make changes to customer profiles. However, the changes may be performed through monitoring center 445. Monitoring center 445 may also provide user access to all of the equipment in mitigation provider 403. Again, the implementer has a flexibility in implementing various embodiments of the present invention to accomplish a desired task.

Customer 415 may operate a network connected to Internet 413. Customer 415 may operate this network by independently or it may obtain service to access Internet 413 through a service provider, like service providers 405, 407, 409, and 411. In customer 415's network, various equipment may be included, especially if customer 415 is a business. Customer 415 may include a server 447, a workstation 449, and a laptop 451. These devices represent some of the elements found in businesses. These elements may operate behind a firewall 453 to shield unauthorized access to the elements from others outside of customer 415. However, firewall 453 cannot always stop data packets associated with a DDoS attack.

Customer 415 may access Internet 413 with a set of routers, like router 457 with a corresponding set of switches identified by a switch 459. The number of routers and switches may vary depending on the configuration of customer 415's network. Also, customer 415 may incorporate a DDoS detector 461 to identify malicious or invalid that may be received. DDoS detector may provide a notification or send an appropriate signal to other devices in customer 415 to engage mitigation provider 403 to reduce or remove the DDoS attack.

As discussed above, service providers 405, 407, 409, and 411 provide customers with access to Internet 413. As shown in FIG. 4, service providers 405, 407, 409, and 411 may communicate with each other as well as communicate with a number of customers or other entities connected to Internet 413. As a result, the customers obtaining service from service providers 405, 407, 409, and 411 are vulnerable to DDoS attacks from computing devices 417, 419, 421, 423, and 425. Computing devices 417, 419, 421, 423, and 425 may target a particular customer, like customer 415, and flood customer 415 with malicious or invalid data packets to disrupts elements within customer 415 from operating properly. With a DDoS attack, the elements may become so overwhelmed with malicious or invalid data packets that they cease to operate or may go into an initialization phase.

Figure 5:
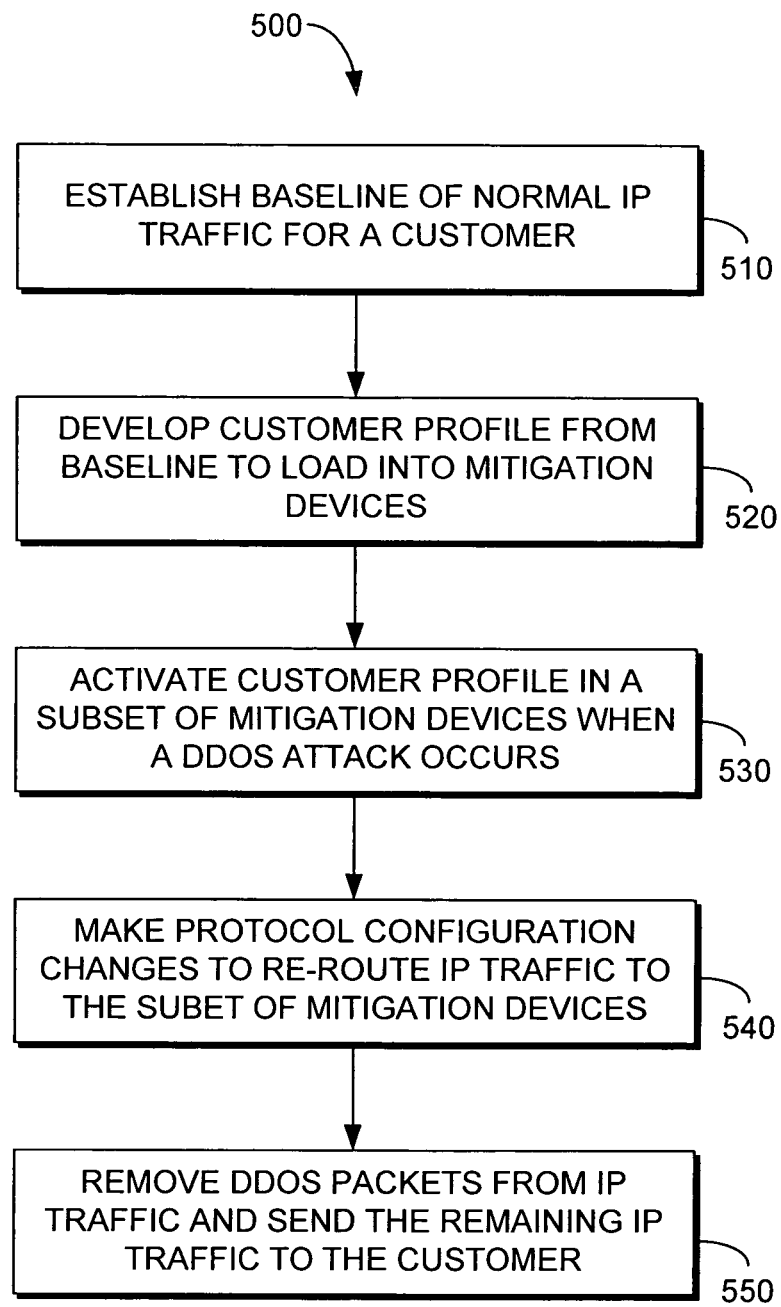
FIG. 5 is a flowchart of an exemplary process for providing a service provider-independent on-demand DDoS mitigation when implementing an embodiment of the present invention.

Turning now to FIG. 5, a process for providing a service provider-independent on-demand DDoS mitigation is shown in a method 500. In a step 510, a baseline is created from observing the data traffic patterns of customer 415. Because different customers operate differently, have different equipment, and are located in different areas relative to Internet 413, the baseline may be different for each customer in identifying normal traffic behavior for data packets that are received or sent from the customer.

In a step 520, a customer profile may be developed from information in the baseline. The customer profile relates to customer 415, including the baseline information and other data that may be needed to load into the set of mitigation devices 439. As stated above, the customer profile establishes the model or the ideal of acceptable traffic for a customer, like customer 415.

Several customer profiles corresponding to different customers may be loaded into the set of mitigation devices 439. Therefore, when a DDoS attack occurs for more than one customer, the customer profile for that particular customer may be activated in a subset of the set of mitigation devices 439. The subset is chosen based on a variety of factors. One factor in selecting the subset is due to locality. Although illustrated together in FIG. 4, the set of mitigation devices 439 may be located in different areas. There may be mitigation devices located in California, Illinois, Virginia, and Texas for example. The mitigation devices do not have to be located in the same area in order to function as part of mitigation device 403. Another factor in selecting the subset may be due to the volume of the DDoS attack. A small DDoS attack may require less resources than a much larger DDoS attack. In yet another factor, the location of the customer may impact which subset of the set of mitigation devices 439 are selected to remove the DDoS attack. A mitigation device that is located in California close to a customer in California may be a better choice for mitigation than a mitigation device in Virginia. As a result, a step 530 illustrates what happens to the customer when the DDoS attack occurs.

In a step 540, mitigation device 403 operates devices contained within it to facilitate protocol configuration changes with service providers 405, 407, 409, and 411. Between mitigation device 403 and service providers 405, 407, 409, and 411, routes between routers may be changed to re-direct IP traffic destined for a customer, like customer 415, to the subset of the mitigation devices 439. The changes may be accomplished in a variety of ways including changing route advertisements. For example, a number of routers incorporate the Border Gateway Protocol (BGP) to handle route advertisements. Configuration information in the routers may be modified so that data packets may be routed elsewhere. And once the threat or attack is over or minimized, the configuration information may be changed again back to the original configuration.

During the DDoS attack, the malicious or invalid packets, as determined by a comparison with the customer profile, are removed as stated in a step 550. The valid data packets are sent through Internet 413 to their destination to customers, like customer 415.

Figure 6:
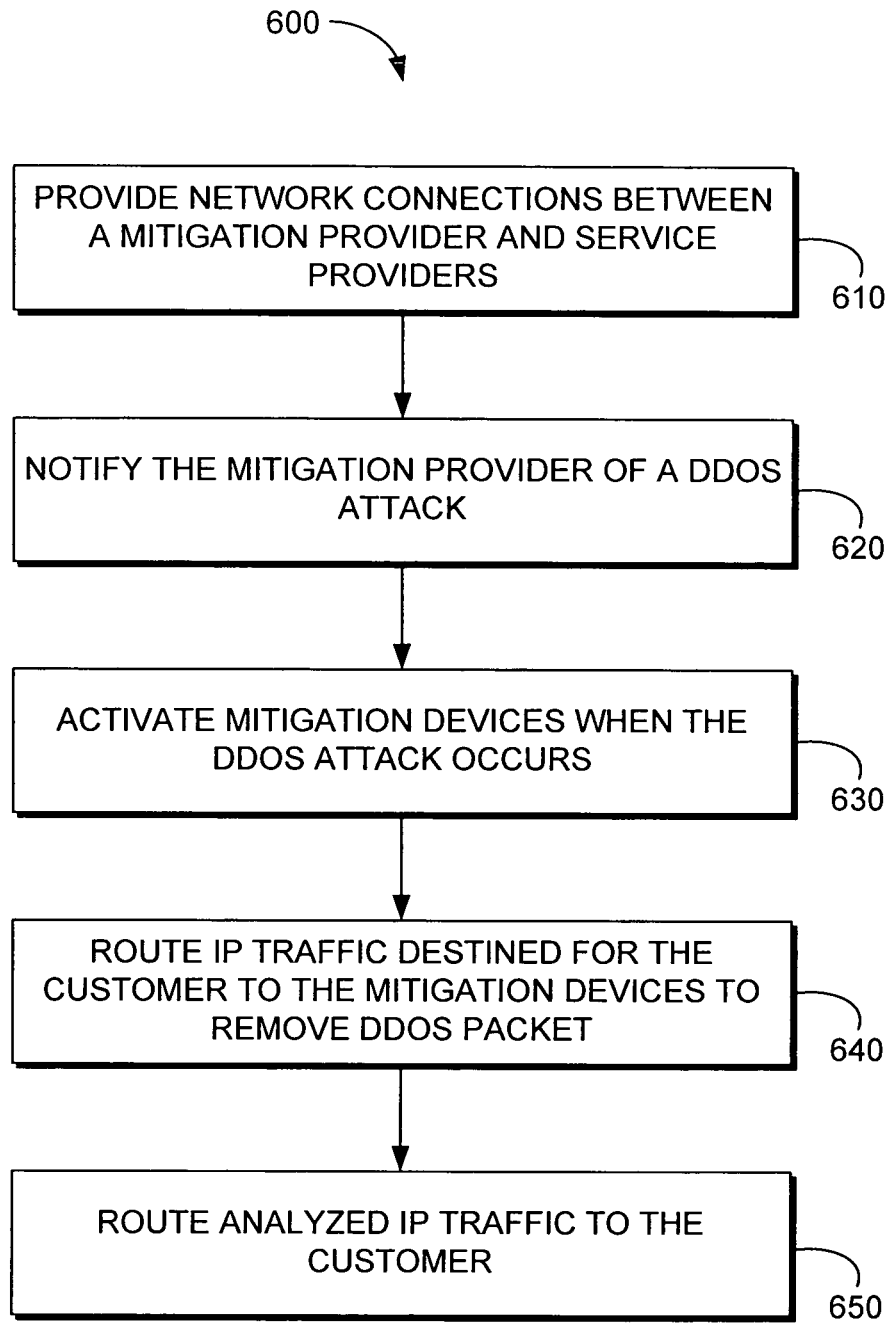
FIG. 6 is a flowchart of another exemplary process for providing a service provider-independent on-demand DDoS mitigation when implementing an embodiment of the present invention.

In FIG. 6, another process for providing a service provider-independent on-demand DDoS mitigation is shown in a method 600. In a step 610, network connections are provided between mitigation provider 403 and service providers 405, 407, 409, and 411. When a DDoS attack occurs originating from computing devices 417, 419, 421, 423, and 425, mitigation provider 403 is notified either from customer 415 or from detection devices established by a third-party or mitigation provider 403 as shown in a step 620. Mitigation devices are activated to remove or reduce the DDoS attack in a step 630. In addition, in a step 640, IP traffic is re-routed to the mitigation devices to remove the DDoS packets. In a step 650, the data packets that are not removed by the mitigation devices are delivered to customer 415.

A scenario may be described below to illustrate an implementation of the present invention. If and when a DDoS attack is detected or suspected, customer 415 notifies mitigation provider 403. Mitigation provider 403 activates customer 415's profile on a subset of the set of mitigation devices 439 and applies appropriate BGP configurations to inject route advertisements to service providers 405, 407, 409, and 411. Once the BGP advertisements are activated, customer 415 may stop announcing its network to service providers 405, 407, 409, and 411 to allow traffic to route to mitigation provider 403.

Once customer 415's traffic reaches mitigation provider 403, an internal network routing protocol may determine which subset of the set of mitigation devices 439 to send customer 415's inbound IP traffic. The subset will filter through customer 415's traffic, removing malicious packets as determined by customer 415's profile loaded into the set of mitigation devices 439. The now "cleaned" IP traffic is forwarded to routers 431 and 433. Routers 431 and 433 may have static-configured tunnels, like generic routing encapsulation (GRE), IP security (IPSEC), and layer two tunneling protocol (L2TP), connected to router 457 in customer 415. Static routes may be implemented for customer 415 and other customers.

Static-configured tunnels will transport customer 415's "cleaned" IP traffic to the premise via Internet 413. Since the static-configured tunnels are point-to-point, the endpoints are usually not part of customer 415's network that is under DDoS attack. Therefore, they are not affected by the BGP advertisements to Internet 413.

IP traffic originating in customer 415's network will route normally across Internet 413 and not through the static-configured tunnel. Mitigation provider 403 implements a one-way data path service and is not intended to "clean" customer-originated malicious traffic. Only malicious traffic destined to the customer network is handled.

The prior discussion is only for illustrative purposes to convey exemplary embodiments. The steps discussed in FIGS. 5 and 6 may be executed without regards to order. Some steps may be omitted and some steps may be executed at a different time than shown. For example, step 540 may be executed before step 530. Step 640 may be executed before step 630. The point here is to convey that the figures are merely exemplary for the embodiments of the present invention and that other embodiments may be implemented for the present invention.

As shown in the above scenarios, the present invention may be implemented in various ways. From the foregoing, it will be appreciated that, although specific embodiments of the invention has been described herein for purposes of illustration, various modifications may be made without deviating from the spirit and scope of the invention. Accordingly, the invention is not limited except as by the appended claims.

The invention claimed is:

1. A computer system having a processor and a memory, the computer system operable to execute a method for providing a service provider-independent on-demand distributed denial of service (DDoS) mitigation, the method comprising:
   creating a baseline of normal internet protocol (IP) traffic for a customer wherein the baseline is an ideal or model traffic pattern of a normal traffic behavior of the customer generated from normal IP traffic that is sent to and from the customer;
   building a customer profile from the baseline to load into a set of mitigation devices prior to a DDoS attack, wherein the customer profile includes information that identifies the model traffic pattern for normal IP traffic for the customer;
   loading the customer profile into the set of mitigation devices;
   activating the customer profile in one or more subsets of the set of mitigation devices when a DDoS attack occurs;
   implementing one or more protocol configurations in one or more routers to route the IP traffic to the one or more subsets of the set of mitigation devices; and
   filtering the IP traffic of a set of DDoS packets based on the customer profile, wherein filtering the IP traffic comprises comparing the IP traffic to the customer profile, determining if one or more members of the IP traffic exceed a limit for a normal traffic pattern for the customer, and if the limit is exceeded, removing the one or more members; and
   routing the IP traffic that is filtered to the customer.

2. The system of claim 1, wherein the baseline includes a data from a statistical reporting of data packets in a network of the customer.

3. The system of claim 1, wherein developing the customer profile comprises converting a set of information in the baseline to another set of information to operate in the set of mitigation devices.

4. The system of claim 1, wherein activating the customer profiles occur at an operations center that monitors one or more networks.

5. The system of claim 1, wherein implementing the one or more protocol configurations comprises at least one of applying route changes to the one or more routers or inputting route advertisements into the one or more routers.

6. The system of claim 5, wherein the one or more protocol configurations include one or more border gateway protocol (BGP) configurations.

7. A computer system having a processor and a memory, the computer system operable to execute a method for implementing a distributed denial of service (DDoS) mitigation network by a mitigation provider, the method comprising:
   providing one or more network connections between the mitigation provider and one or more service providers to provide access from the mitigation provider to one or more customers associated with the one or more service providers;
   loading a customer profile for each of the one or more customers into a set of mitigation devices prior to a DDoS attack, wherein the customer profile includes information that identifies a model traffic pattern for normal IP traffic for the customer;
   with a DDoS detection method implemented to detect a DDoS attack to a customer, at least one of notifying the mitigation provider of the DDoS attack by the customer or detecting the DDoS attack by the mitigation provider at an equipment of the customer;
   activating a subset of the set of mitigation devices by the mitigation provider when the DDoS attack occurs, the subset is activated based on a locality of the mitigation devices in proximity to the DDoS attack, a volume of the DDoS attack, or the locality of the customer in proximity to the mitigation devices; and
   routing an internet protocol (IP) traffic destined for the customer to the set of mitigation devices to remove one or more DDoS packets, wherein routing the IP traffic comprises comparing the IP traffic to the customer profile loaded into the set of mitigation devices wherein the customer profile identifies a normal traffic behavior of the customer, determining if one or more members of the IP traffic exceed the normal traffic behavior, and if the normal traffic behavior is exceeded, removing the one or more members, and wherein an analyzed IP traffic is subsequently routed to the customer.

8. The system of claim 7, wherein the mitigation provider is distinct from the one or more service providers that provide at least one or an Internet access or an Internet service.

9. The system of claim 7, wherein routing IP traffic comprises modifying a set of protocol configurations in a set of routers to route the IP traffic destined for the customer to the set of mitigation devices.

10. The system of claim 9, wherein the set of protocol configurations include a border gateway protocol (BGP) configuration.

11. The system of claim 7, wherein the one or more members include the one or more DDoS packets.

12. One or more non-transitory computer-readable media having computer-readable instructions executable by a computer for causing a computing device to perform a method for providing a service provider-independent on-demand distributed denial of service (DDoS) mitigation, the method comprising:
   creating a baseline of normal internet protocol (IP) traffic for a customer, wherein the baseline is an ideal or model traffic pattern of a normal traffic behavior of the customer generated from normal IP traffic that is sent to and from the customer;
   building a customer profile from the baseline to load into a set of mitigation devices prior to a DDoS attack, wherein the customer profile includes information that identifies the model traffic pattern for normal IP traffic for the customer;
   loading the customer profile into the set of mitigation devices;
   activating the customer profile in one or more subsets of the set of mitigation devices when a DDoS attack occurs;
   implementing one or more protocol configurations in one or more routers to route the IP traffic to the one or more subsets of the set of mitigation devices; and
   filtering the IP traffic of a set of DDoS packets based on the customer profile, wherein filtering the IP traffic comprises comparing the IP traffic to the customer profile, determining if one or more members of the IP traffic exceed a limit for a normal traffic pattern for the customer, and if the limit is exceeded, removing the one or more members; and
   routing the IP traffic that is filtered to the customer.

13. One or more non-transitory computer-readable media having computer-readable instructions executable by a computer for causing a computing device to perform a method for implementing a distributed denial of service (DDoS) mitigation network by a mitigation provider, the method comprising:

providing one or more network connections between the mitigation provider and one or more service providers to provide access from the mitigation provider to one or more customers associated with the one or more service providers;

loading a customer profile for each of the one or more customers into a set of mitigation devices prior to a DDoS attack, wherein the customer profile includes information that identifies a model traffic pattern for normal IP traffic for the customer;

with a DDoS detection method implemented to detect a DDoS attack to a customer, at least one of notifying the mitigation provider of the DDoS attack by the customer or detecting the DDoS attack by the mitigation provider at an equipment of the customer;

activating a subset of the set of mitigation devices by the mitigation provider when the DDoS attack occurs, the subset is activated based on a locality of the mitigation devices in proximity to the DDoS attack, a volume of the DDoS attack, or the locality of the customer in proximity to the mitigation devices; and routing an internet protocol (IP) traffic destined for the customer to the set of mitigation devices to remove one or more DDoS packets, wherein routing the IP traffic comprises comparing the IP traffic to the customer profile loaded into the set of mitigation devices wherein the customer profile identifies a normal traffic behavior of the customer, determining if one or more members of the IP traffic exceed the normal traffic behavior, and if the normal traffic behavior is exceeded, removing the one or more members, and wherein an analyzed IP traffic is subsequently routed to the customer.

* * * * *